Aug. 16, 1932.  E. F. BEGTRUP  1,872,391

CRUCIBLE FOR ALUMINO-THERMIC REACTIONS

Filed April 7, 1932

INVENTOR
Edward F. Begtrup
BY
HIS ATTORNEY

Patented Aug. 16, 1932

1,872,391

UNITED STATES PATENT OFFICE

EDWARD F. BEGTRUP, OF JERSEY CITY, NEW JERSEY

CRUCIBLE FOR ALUMINO-THERMIC REACTIONS

Application filed April 7, 1932. Serial No. 603,799.

The invention relates to certain improvements in crucibles for alumino-thermic and similar reactions and has for its object to make said crucibles of such form that the walls defining the basin or reaction chamber may be formed of non-refractory material, such as iron or steel, without danger of impairment of the walls by the superheated molten products of the reaction. To this end, the invention involves the formation of the crucible with a basin of shallow depth as compared with its capacity and having a bottom of relatively large superficial area, whereby part of the molten slag resulting from the reaction will adhere to the inner walls of the crucible, will insulate and protect said walls from contact with the molten metal and the eroding or melting effect of such contact due to the high heat of the reaction products, the slag coating also serving as an insulator to prevent material loss of superheat by the reactive mass.

The invention is illustrated in one of its simplest exemplifications in the accompanying drawing, in which.

Figure 1:
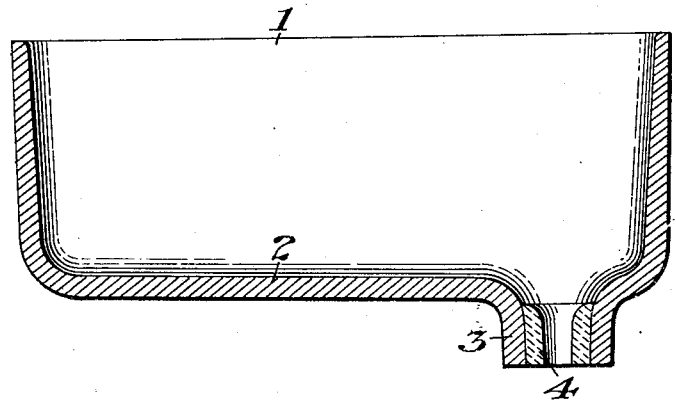
Fig. 1 is a longitudinal sectional elevation of the crucible.
Figure 2:
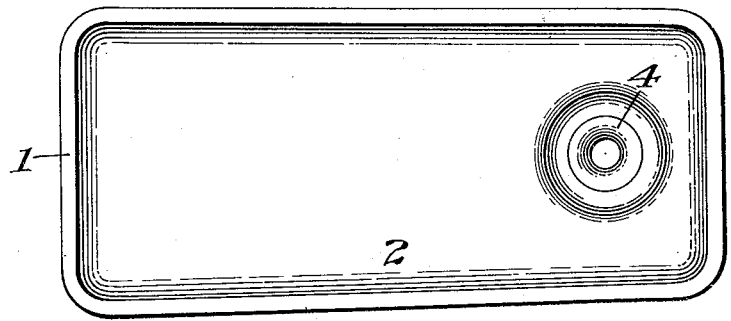
Fig. 2 is a plan view thereof.

Crucibles as heretofore used for alumino-thermic and similar reactions, the metallic products of which reactions have been employed for welding and similar purposes, have usually been of general conical or frusto-conical form with bottoms of relatively small superficial area as compared with the depth of the crucibles and the cubic capacities of the latter and such crucibles have almost invariably been provided with a refractory lining, usually ground magnesite with a burned out tar binder, to enable the crucibles to withstand the high reaction temperature, approximately 5400° F., the crucibles usually being provided with a tap hole in the bottom thereof, when employed in rail welding or similar operations. With such a crucible, each reaction wears, melts or erodes away part of the lining and, after repeated reactions, it becomes necessary to renew the lining.

Various experiments and extensive research have been devoted to the production of these reaction crucibles to avoid the intense erosive effects of the products of the reactions and thereby obviate the necessity of frequent relining of the crucibles, but these efforts have resulted in no material improvement in the crucibles, increasing the normal period of usefulness thereof. Among the previous attempts made to solve the difficulty, crucibles made entirely of steel, of varying wall thickness, but conforming to the more or less conventional conical shape have been used but without material success. Based upon a long series of observations, while conducting these experiments, it has been concluded that an all metal crucible of a conical shape, or frusto-conical shape, having a bottom of small superificial area, cannot be made to operate satisfactorily and consistently. It has been found that with crucibles of this character, there is too great a bulk or mass of the highly superheated steel resulting from the reaction close or adjacent to the walls of the crucible and also that, during and after the reaction, there is a considerable boiling or ebullition in and throughout the upper portion of the mass of molten steel. The condition prerequisite to the use of the all metal crucibles in this particular art is that the initial reaction of the alumino-thermic mixture causes the deposit of a thin superficial layer or coating of the slag on the walls of the crucible which was presumed to protect the metal walls from direct contact with the superheated molten metal, but, as stated, the results did not come up to expectations and the all metal crucibles of the conventional conical form were, of necessity, discarded in favor of the refractory crucible or the refractory lined crucible.

The alumino-thermic iron mixture, such as generally employed for welding operations, and especially for rail welding, produces, upon reaction, approximately 60% superheated liquid steel and 40% superheated alumina slag, by weight, and, by volume, this represents approximately 43% liquid steel and 57% liquid slag, all of which is produced at a very high temperature. In a conical or substantially conical shaped crucible, the 43% of superheated liquid steel collects at the bottom of the crucible, due to its higher specific gravity, and the ratio of the depth or thickness of this mass of superheated steel to its volume or bulk is very high. During the reaction, that part of the liquid alumina slag which comes in contact with the metal walls of the crucible quickly chills to a solid, semi-solid, or plastic state and adheres to the metal surface in the form of a thin coating, thereby preventing the liquid steel immediately coming into direct intimate contact with the metal surface of the crucible walls. However, in a crucible of the conical shape indicated, the mass or bulk of superheated molten steel with its high ratio of depth, together with the boiling action which results in masses of this character, washes and/or melts away the chilled coating of alumina slag and also the subjacent metal of the crucible walls. This melting or washing away of the slag coating usually occurs and is more pronounced in the zone adjacent to the upper level of the mass of liquid steel, where the violent agitation or boiling occurs, and this action is particularly pronounced at the dividing line or plane between the molten steel and the molten slag.

It has been found, in actual practice, that, if the bulk of the molten steel be kept out of proximity to the crucible walls and if the violent agitation or boiling of the metal be materially reduced, an all metal crucible may be employed successfully and for an indefinite number of reactions without impairment. Both of these conditions may be realized by so forming the basin of the crucible that the reactive material will be spread over a considerable area and the depth thereof in the crucible materially reduced as compared with the former practice. Preferably, the crucible is in the form of a relatively shallow, elongated, rectangular or oval vessel having a relatively large bottom area which may be either concaved, trough shaped or annularly dished. The fundamental principle underlying the design of the crucible is that it will present a low ratio of height to mass or area of the molten steel products of the reaction. Otherwise stated, the all metal crucible is preferably a shallow vessel having a bottom of large area.

The crucible illustrated in the accompanying drawing is exemplary of one of many different embodiments of the invention, but is, nevertheless, illustrative of a type that has proven particularly effective in welding railway rails by the alumino-thermic process, the said crucible comprising a generally rectangular basin or receptacle 1 having a bottom 2 of relatively large area, the basin being of shallow depth relative to its length and its cubic capacity, so that the thermit or other exothermic mixture constituting a charge for a given welding operation will be in the form of a bed that is relatively shallow or thin as compared with its superficial area. As illustrated, the tap hole nipple 3 is located in the bottom of the crucible, preferably near one end of the latter, and is provided with the usual refractory thimble 4, when the latter is found necessary or desirable.

With such a crucible, the first molten steel and alumina slag produced in the reaction quickly sinks to the bottom through the relatively shallow bed of the reactive charge and, in doing so, propagates the reaction along this downward path. When this first portion of molten steel and slag reaches the bottom of the crucible, it is probable that the elements of the metal and slag are intermixed in a conglomerate mass and it is also quite probable that the raw mixture in the bottom zone of the mass surrounding this first molten steel and slag is reacting in more or less isolated spots within this zone. Inasmuch as there is a preponderance of molten alumina slag, by volume, the small molten steel globules, at this stage of the reaction, are probably completely or practically surrounded by and encased in the molten slag, thereby preventing any appreciable area or areas of contact between the molten steel globules and the bottom wall of the crucible. Meanwhile the preponderant volume of alumina slag spreads over the bottom wall and, due to the chilling effect of this wall, forms a solidified or semi-solid protective coating, which effectively prevents any molten steel produced by the advancing reaction coming into direct contact with the bottom wall. As the reaction progresses, a pool of molten steel and slag forms in the bottom of the crucible and, the molten slag being of less specific gravity, rises through and floats above the molten steel and, as the depth of the pool increases, the molten alumina slag progressively coats the remainder of the bottom and the side walls of the metallic crucible, thereby providing protection for the entire interior wall surface of the crucible with which the reaction products come in contact. This coating is in the form of a thin layer of slag, which firmly adheres to the iron or steel walls of the crucible and constitutes a permanent protective agency to prevent erosion or melting of the walls by the superheated metal constituent of the reaction. In other words, after the first reaction in the new crucible has been effected, it is found that the coating of alumina slag on the interior walls of the crucible is left intact and, as stated, becomes a permanent protective coating.

It has been found that the thickness of the protective slag coating may be controlled or determined by varying the chill effect of the crucible walls, which effect may be varied in a number of ways, as, for example, by varying the thickness of the crucible walls, by choice of material for the walls having greater or lesser thermal conductivity, by the use of heat insulating or non-heat insulating material to back up the crucible walls, by the use of heat dissipating fins on the exterior of the walls, and various other expedients which will be apparent to those skilled in the art. Conservation of the superheat of the products of the reaction may also be controlled in the same or similar manner.

It will be apparent that the fundamental principle of the invention does not preclude the use of a partial lining of refractory material, as, for example, a relatively light refractory lining applied to all or part of the bottom or to all or part of the side walls, but, as a general proposition, the application of a lining of this character is not necessary inasmuch as a lining consisting of a relatively thin layer of protective slag is automatically produced and applied during the first alumino-thermic reaction carried out in the crucible, so that, in its fundamental aspects, the invention contemplates a crucible of the prescribed form that is, in effect, self-lining at all points below the upper level of the molten products of the reacted charge.

As hereinbefore stated, conservation of the superheat of the products of reaction may be controlled or predetermined. It has been discovered that there is some loss of superheat, particularly in the steel or metal product of the reaction, in the initial reaction, in such a crucible by reason of the contact of the molten products with the bottom wall of the crucible. This, however, applies only to the first or initial reaction carried out in the crucible and this objection may be readily obviated by sprinkling or spreading a layer of ground particles of alumina slag or the like over the bottom of the crucible before the initial reaction, so that this thin layer of loose slag will be melted promptly, as the reaction progresses, and, because of the affinity of the molten slag for the iron or steel bottom wall of the crucible, will adhere to the inner face of the bottom wall and provide the necessary protective coating and thereby prevent any damage to the bottom wall even by the said first or initial reaction.

For most effective conservation of the superheat of the products of reaction, the bottom and side walls of the crucible should be as thin as possible and preferably made of a metal or metal alloy of low thermal conductivity, such, for example, as iron or steel.

A crucible of the character described possesses many advantages over the crucibles as heretofore employed for this particular purpose, among which advantages are that it requires no prediminary permanent refractory lining, that it may be employed for an indefinite time and for an indefinite number of reactions without material impairment, it is of low first cost, involves no expense of up-keep, avoids the delay and cost of relining, produces quiet reactions, due to the distribution of the body of reactive material therein, will withstand rough handling and usage, is relatively light, compact and, therefore may be readily transported and applied to its intended use without special accessories required for the heavy and cumbersome generally conical or pot-like crucibles with their refractory linings as heretofore employed. When the new crucible is to be used for effecting the welding of rails and similar elements, it may be provided with a tap hole in its bottom, or, when used in the welding of pipes or other special applications, it may be provided with the usual pouring lip or spout.

What I claim is:

1. A crucible for alumino-thermic and similar reactions having basin-defining walls, including the bottom, of non-refractory material, said basin being of shallow depth as compared with its capacity and the bottom being of relatively large superficial area.

2. A crucible for alumino-thermic and similar reactions, comprising a shallow vessel having a bottom of large area formed of non-refractory material.

3. A crucible for alumino-thermic and similar reactions, comprising a shallow vessel having a botom of large area formed of metal having low thermal conductivity.

4. A crucible for alumino-thermic and similar reactions, comprising a shallow vessel having a bottom of large area formed of ferrous metal.

5. A crucible as defined in claim 2, in which the walls below the upper level of the reaction products and the bottom have a thin superficial coating of slag.

In testimony whereof I affix my signature.

EDWARD F. BEGTRUP.